(12) United States Patent
Gur (10) Patent No.: US 12,276,801 B2
(45) Date of Patent: Apr. 15, 2025

(54) OPTICAL DEVICE SUITABLE FOR ILLUMINATING THE RETINA

(71) Applicant: EYEJETS LTD., Modi'in (IL)

(72) Inventor: Joshua Gur, Jerusalem (IL)

(73) Assignee: EYEJETS LTD., Modi'in (IL)

( * ) Notice: Subject to any disclaimer, the term of this patent is extended or adjusted under 35 U.S.C. 154(b) by 0 days.

(21) Appl. No.: 18/718,290

(22) PCT Filed: Sep. 21, 2023

(86) PCT No.: PCT/IL2023/051023
§ 371 (c)(1),
(2) Date: Jun. 10, 2024

(87) PCT Pub. No.: WO2024/062483
PCT Pub. Date: Mar. 28, 2024

(65) Prior Publication Data
US 2025/0060591 A1 Feb. 20, 2025

Related U.S. Application Data

(60) Provisional application No. 63/408,562, filed on Sep. 21, 2022.

(51) Int. Cl.
*G02B 27/00* (2006.01)
*G02B 27/01* (2006.01)

(52) U.S. Cl.
CPC ..... *G02B 27/0172* (2013.01); *G02B 27/0093* (2013.01); *G02B 2027/0125* (2013.01)

(58) Field of Classification Search
CPC ............ G02B 27/0093; G02B 27/0172; G02B 2027/0125
See application file for complete search history.

(56) References Cited

U.S. PATENT DOCUMENTS 10,254,547 B2   4/2019  Tremblay et al.
2017/0188021 A1* 6/2017  Lo ........................ H04N 13/322
(Continued)

FOREIGN PATENT DOCUMENTS

EP      3296797 A1    3/2018
WO   2021064734 A2    4/2021

OTHER PUBLICATIONS

International Search Report and Written Opinion of International Searching Authority of PCT/IL2023/051023, mailed Jan. 31, 2024.—pp. 8.

*Primary Examiner* — Ryan A Lubit
(74) *Attorney, Agent, or Firm* — The Law Office of Joseph L. Felber (57) ABSTRACT

A wearable virtual retinal display (VRD) device configured to be worn by a person comprises a spectacle-like frame puttable on a head of said person; said spectacle-like frame carrying following elements disposed along a laser beam: (a) a laser light source configured for generating said laser beam at at least one radiation frequency; (b) a microelectromechanical system (MEMS) configured for scanning said laser beam forming a laser radiation pattern to be projected to a person's retina; (c) a lens; (d) a selective reflector positionable in front of a person's eye. The selective reflector is configured for reflecting laser radiation at the at least one frequency. The selective reflector has a piecewise-smooth reflective surface comprising a plurality of curvilinear selective reflecting elements, which in cooperation with said lens are configured for directing said laser radiation pattern onto a person's retina; said laser radiation pattern being scanned by said MEMS forms an image of an object of interest on said person's retina.

20 Claims, 11 Drawing Sheets

(56) References Cited

U.S. PATENT DOCUMENTS

| | | | |
|---|---|---|---|
| 2017/0212349 A1* | 7/2017 | Bailey | G02B 26/10 |
| 2017/0285343 A1* | 10/2017 | Belenkii | H04N 13/344 |
| 2018/0084232 A1* | 3/2018 | Belenkii | H04N 9/3105 |
| 2022/0368105 A1* | 11/2022 | Shahin | H01S 5/0652 |
| 2023/0296868 A1* | 9/2023 | Nestorovic | G02B 17/0657 |
| | | | 356/4.01 |

* cited by examiner

OPTICAL DEVICE SUITABLE FOR ILLUMINATING THE RETINA

CROSS REFERENCE TO RELATED APPLICATIONS

This application is a National Phase of PCT Patent Application No. PCT/IL2023/051023 having International filing date of Sep. 21, 2023, which claims the benefit of priority of U.S. Provisional Patent Application No. 63/408,562, filed Sep. 21, 2022, the contents of which are all incorporated herein by reference in their entirety.

FIELD OF THE INVENTION

The invention, in some embodiments, relates to the field of optical devices and more particularly, but not exclusively, to optical devices suitable for illuminating the retina. Some embodiments of such optical devices are useful for use in implementing eye trackers and/or virtual retinal displays.

BACKGROUND OF THE INVENTION

A virtual retinal display (VRD) is a device whereby an image is displayed to a person by drawing the image on the retina with laser light, for example using a raster scan. The image can be a monochromatic-image (when a single laser having a single color is used to draw the image) or a color-image (when multiple lasers, e.g., a red, a green and a blue laser are used to draw the image). Typically, a complete image is drawn on the retina at a rate of at least 30 Hz, more preferably at least 60 Hz so that the person perceives the image floating in space. VRD can be applied to a single eye of a person, or simultaneously to both eyes. When applied to both eyes, identical images can be drawn on the two eyes, a stereoscopic pair of images can be drawn on the two eyes, or different images can be drawn on the two eyes. A series of succeeding images can be a single image (still) displayed for an extended period of time or the series of succeeding images can constitute a video.

A VRD comprises two units: an eye tracker and a display unit.

The eye tracker tracks the position of the eye, preferably at a rate at least as fast as the rate of display of the images.

The display unit draws the desired image with one or more lasers on the retina with reference to the position of the eye determined by the eye tracker to compensate for eye movement to ensure that the individual images of a series of image are displayed at the same location on the retina. In colored VRD, multiple colors are typically drawn in the retina simultaneously.

In PCT publication WO 2021/064734, the Inventor has disclosed an optical device suitable for use as both an eye tracker and a display unit.

SUMMARY OF THE INVENTION

It is hence one object of the invention to disclose a wearable virtual retinal display (VRD) device configured to be worn by a person. The aforesaid VRD comprises a spectacle-like frame puttable on a head of the person; the spectacle-like frame carrying the following elements disposed along a laser beam: (a) a laser light source configured for generating the laser beam at at least one radiation frequency; (b) a microelectromechanical system (MEMS) configured for scanning the laser beam forming a laser radiation pattern to be projected to a person's retina; (c) a lens and (d) a selective reflector positionable in front of a person's eye; the selective reflector being configured for reflecting laser radiation at the at least one frequency. The selective reflector in cooperation with the lens is configured for directing the laser radiation pattern onto a person's retina. The laser radiation pattern being scanned by the MEMS forming an image of an object of interest on the person's retina.

Another object of the invention is to disclose the reflector which is semitransparent for surrounding light and enables seeing surrounding space by the person.

A further object of the invention is to disclose the VRD device comprising at least one folding mirror configured for directing the scanned laser beam onto the reflector.

A further object of the invention is to disclose VRD device comprising a gaze tracking unit which in coordination with the MEMS is configured for forming a momentary laser radiation pattern within a field of view corresponding to a momentary gaze direction of the eye such that the laser radiation pattern is projectable onto the eye retina through an eye pupil of the person at any position of the pupil.

A further object of the invention is to disclose MEMS configured for forming the laser radiation pattern within an extended field of view such that the laser radiation pattern is partially observable by means of moving the eye pupil within the laterally extended field.

A further object of the invention is to disclose a wearable virtual retinal display (VRD) device configured to be worn by a person. The aforesaid VRD comprises a spectacle-like frame puttable on a head of the person; the spectacle-like frame carrying the following elements disposed along a laser beam: (a) a laser light source configured for generating the laser beam at at least one radiation frequency; (b) a microelectromechanical system (MEMS) configured for scanning the laser beam forming a laser radiation pattern to be projected to a person's retina; (c) first and second optical channels for projecting the laser radiation pattern to the person's retina; the first channel comprising a first lens and a first selective reflector positionable in front of a person's eye; the second channel comprising a second lens, at least two folding mirrors and second selective reflector positionable in front of a person's eye adjacent to the first selective reflector; the first and second selective reflectors being configured for reflecting laser radiation at the at least one frequency; the first and second selective reflectors in cooperation with the first and second lenses being configured for directing the laser radiation pattern onto a person's retina; the laser radiation pattern being scanned by the MEMS forming an image of an object of interest on the person's retina.

It is the purpose of the present invention to provide the first and second selective reflectors being arranged in an integrated optical element having a piecewise-smooth reflective surface comprising a plurality of curvilinear selective reflecting elements belonging to the first and second selective reflectors and at least partially arranged in turn to each other.

A further object of the invention is to disclose the reflector which is semitransparent for surrounding light and enables seeing surrounding space by the person.

A further object of the invention is to disclose the laser light source, MEMS, first and second lenses which are displaceable for adjusting the laser radiation pattern to be projected onto the person's retina.

A further object of the invention is to disclose the integrated optical element which is a profiled molded element carrying a spectrally selective reflecting coating at the at least one radiation frequency.

A further object of the invention is to disclose the VRD device comprising a gaze tracking unit which in coordination with the MEMS is configured for forming a momentary laser radiation pattern within a field of view corresponding to a momentary gaze of the eye such that the laser radiation pattern is projectable onto the eye retina at any position of the person's eye.

A further object of the invention is to disclose the selective reflector in cooperation with the lens configured for forming the laser beam passing through the eye pupil into a spot having an area ranging between 0.75 and 1.25 mm$^2$ resulting in a pinhole effect.

A further object of the invention is to disclose the first and second optical channels configured for forming the laser radiation pattern within an extended field of view such that the laser radiation pattern is partially observable by means of moving the eye pupil within the extended field.

A further object of the invention is to disclose a VRD device configured to be worn by a person. The aforesaid VRD comprises a spectacle-like frame puttable on a head of the person. The spectacle-like frame carries first and second optical channels for projecting a laser radiation pattern to a person's retina. The first channel comprises: (a) a first laser light source configured for generating the laser beam at at least one radiation frequency; (b) a first microelectromechanical system (MEMS) configured for scanning the laser beam forming a laser radiation pattern to be projected to a person's retina; (c) a first lens; and (d) a first reflector positionable in front of a person's eye. The second channel comprises: (a) a second laser light source configured for generating the laser beam at at least one radiation frequency; (b) a second microelectromechanical system (MEMS) configured for scanning the laser beam forming a laser radiation pattern to be projected to a person's retina; (c) a second lens; (d) at least two folding mirrors; and (e) second selective reflector positionable in front of a person's eye adjacent to the first selective reflector.

The first and second reflectors are configured for reflecting laser radiation at the at least one frequency generated by the first and second laser light sources. The first and second selective reflectors in cooperation with the first and second lenses being configured for directing the laser radiation pattern onto a person's retina. The laser radiation pattern is scanned by the MEMS forming an image of an object of interest on the person's retina. The first and second selective reflectors are arranged in an integrated optical element having a piecewise-smooth reflective surface comprising a plurality of curvilinear selective reflecting elements belonging to the first and second selective reflectors and at least partially arranged in turn to each other.

A further object of the invention is to disclose the laser light source, MEMS, first and second lenses which are displaceable for adjusting the laser radiation pattern to be projected onto the person's retina.

A further object of the invention is to disclose the integrated optical element which is a profiled molded element carrying a spectrally selective reflecting coatings at the at least one radiation frequency.

A further object of the invention is to disclose a method of projecting a laser radiation pattern onto a person's retina. The aforesaid method comprises steps of: (a) providing a wearable virtual retinal display (VRD) device configured to be worn by a person; the VRD comprising a spectacle-like frame puttable on a head of the person; the spectacle-like frame carrying the following elements disposed along a laser beam: (i) a laser light source configured for generating the laser beam at at least one radiation frequency; (ii) a microelectromechanical system (MEMS) configured for scanning the laser beam forming a laser radiation pattern to be projected to a person's retina; (iii) a lens and (iv) a selective reflector positionable in front of a person's eye; the selective reflector configured for reflecting laser radiation at the at least one frequency; the selective reflector in cooperation with the lens being configured for directing the laser radiation pattern onto a person's retina; the laser radiation pattern being scanned by the MEMS forming an image of an object of interest on the person's retina; (b) putting the VRD device on a head of the person; (c) generating the laser beam at at least one radiation frequency; (d) forming a laser radiation pattern by scanning the laser radiation; (e) projecting the laser radiation pattern onto the person's retina; (f) forming the image of the object of interest on the person's retina.

A further object of the invention is to disclose a method of projecting a laser radiation pattern onto a person's retina. The aforesaid method comprises steps of: (a) providing a VRD device configured to be worn by a person; the VRD comprising a spectacle-like frame puttable on a head of the person; the spectacle-like frame carrying first and second optical channels for projecting a laser radiation pattern to a person's retina; the first channel comprising: (i) a first laser light source configured for generating the laser beam at at least one radiation frequency; (ii) a first microelectromechanical system (MEMS) configured for scanning the laser beam forming a laser radiation pattern to be projected to a person's retina; (iii) a first lens; and (iv) a first reflector positionable in front of a person's eye; the second channel comprising: (i) a second laser light source configured for generating the laser beam at at least one radiation frequency; (ii) a second microelectromechanical system (MEMS) configured for scanning the laser beam forming a laser radiation pattern to be projected to a person's retina; (iii) a second lens; (iv) at least two folding mirrors; and (v) second selective reflector positionable in front of a person's eye adjacent to the first selective reflector; the first and second selective reflectors being configured for reflecting laser radiation at the at least one frequency and being transparent to surrounding radiation; the first and second selective reflectors in cooperation with the first and second lenses being configured for directing the laser radiation pattern onto a person's retina; the laser radiation pattern being scanned by the MEMS forming an image of an object of interest on the person's retina; the first and second selective reflectors are arranged in an integrated optical element having a piecewise-smooth reflective surface comprising a plurality of curvilinear selective reflecting elements belonging to the first and second selective reflectors and at least partially arranged in turn to each other; putting the VRD device on a head of the person; generating the laser beam at at least one radiation frequency; (b) forming a laser radiation pattern by scanning the laser radiation; (c) projecting the laser radiation pattern via the first and second optical channels onto the person's retina; (d) forming the image of the object of interest on the persons retina.

The step of projecting the laser radiation pattern is performed by cooperatively focusing by the first lens/first selective reflector and the second lens/second selective reflector belonging to the first and second optical channels; the first and second selective reflectors are arranged in an integrated optical element having a piecewise-smooth reflective surface comprising a plurality of curvilinear selective reflecting elements belonging to the first and second selective reflectors and arranged in turn to each other.

A further object of the invention is to disclose a method of projecting a laser radiation pattern onto a person's retina. The aforesaid method comprises steps of: (a) providing a wearable virtual retinal display (VRD) device configured to be worn by a person; the VRD comprising a spectacle-like frame puttable on a head of the person; the spectacle-like frame carrying elements disposed along a laser beam: (i) a laser light source configured for generating the laser beam at at least one radiation frequency; (ii) a microelectromechanical system (MEMS) configured for scanning the laser beam forming a laser radiation pattern to be projected to a person's retina; first and second optical channels for projecting the laser radiation pattern to the person's retina; the first channel comprising a first lens and a first selective reflector positionable in front of a person's eye; the second channel comprising a second lens, at least two folding mirrors and second selective reflector positionable in front of a person's eye adjacent to the first selective reflector; the first and second selective reflectors being configured for reflecting laser radiation at the at least one frequency and being transparent to surrounding radiation; the first and second selective reflectors in cooperation with the first and second lenses being configured for directing the laser radiation pattern onto a person's retina; the laser radiation pattern being scanned by the MEMS forming an image of an object of interest on the person's retina; (a) putting the VRD device on a head of the person; (b) generating the laser beam at at least one radiation frequency; (c) forming a laser radiation pattern by scanning the laser radiation; (d) projecting the laser radiation pattern via the first and second optical channels onto the person's retina; (e) forming the image of the object of interest on the person's retina.

BRIEF DESCRIPTION OF THE DRAWINGS

In order to understand the invention and to see how it may be implemented in practice, a plurality of embodiments is adapted to now be described, by way of non-limiting example only, with reference to the accompanying drawings, in which.

DETAILED DESCRIPTION OF THE INVENTION

The following description is provided, so as to enable any person skilled in the art to make use of the invention and sets forth the best modes contemplated by the inventor of carrying out this invention. Various modifications, however, are adapted to remain apparent to those skilled in the art, since the generic principles of the present invention have been defined specifically to provide a VRD and a method of using the same.

The principles, uses and implementations of the teachings of the invention may be better understood with reference to the accompanying description and figures. Upon perusal of the description and figures present herein, one skilled in the art is able to implement the teachings of the invention without undue effort or experimentation. In the figures, like reference numerals refer to like parts throughout.

Before explaining at least one embodiment of the invention in detail, it is to be understood that the invention is not necessarily limited in its application to the details of construction and the arrangement of the components and/or methods set forth herein. The invention is capable of other embodiments or of being practiced or carried out in various ways. The phraseology and terminology employed herein are for descriptive purpose and should not be regarded as limiting.

As noted above, VRD is designed for illuminating the retina. Typically, the retina is illuminated using a laser, which directs an appropriately intensity-modulated beam of light at the moveable mirror of a MEMS mirror system (such as available from Hamamatsu Photonics KK, Hamamatsu City, Shizuoka, Japan). The moveable mirror is moved by a computer processor to direct the laser light through the pupil to a desired location on the retina. Typically, the laser and the mirror are fixedly attached to a wearable frame, such as an eyeglass frame, that is worn by a user. As is known, the optical axis of the eye continuously moves relative to the head of the user and consequently relative to the worn frame. When all factors are considered, it is challenging to provide an optical device that is attached to a wearable frame that can direct laser light through a pupil to illuminate the retina while the optical axis of the eye moves.

Herein is disclosed an optical device comprising a laser for emitting a beam of light having a wavelength $\lambda_1$, a MEMS mirror system comprising a moveable mirror and a set of curved mirrors attached to a wearable frame having a vertical axis and a horizontal axis, where the set of curved mirrors is located in front of an eye of a person wearing the frame (a wearer) and covering at least part of the field of view thereof (analogously to the location of the lens of eyeglasses), the device configured to allow reflection of light from the laser by the moveable mirror to a selected mirror of the set of mirrors, and from the selected mirror through the pupil of a wearer to illuminate the retina of the eye, the selected mirror being a mirror of the set that allows reflection of light through the pupil of the wearer to illuminate the retina. When the frame is worn, the vertical axis of the frame is parallel to the vertical axis of the head of the wearer and is perpendicular to the transverse plane of the head of the wearer (the plane that separates the upper and lower parts of the head). When the frame is worn, the horizontal axis of the frame is parallel to the horizontal axis of the head of the wearer and is perpendicular to the sagittal plane of the head of the wearer (the plane that separates the left and right parts of the head). The frontal plane of the device is the plane that includes both the vertical axis and the horizontal axis. The gaze direction of a wearer who looks straight ahead is perpendicular to the frontal plane of the device.

In some embodiments, the optical device comprises at least two lasers, a first laser as described above for emitting a beam of light having a wavelength $\lambda_1$, and a second laser as described above for emitting a beam of light having a wavelength $\lambda_2$. In some such embodiments, the optical device comprises a third laser for emitting a beam of light having a wavelength $\lambda_3$. In some such embodiments, the optical device comprises a fourth laser for emitting a beam of light having a wavelength $\lambda_4$.

In some embodiments, one or more of the mirrors of the set of mirrors is a broadband reflective mirror. In typical such embodiments, the mirror is opaque or distorts vision therethrough.

In some preferred embodiments, one, more than one and, in preferred embodiments all of the mirrors of the set of mirrors are wavelength-selective mirrors. A wavelength-selective mirror is a mirror that reflects substantially only light having wavelengths of the one or more lasers of the device. In some embodiments, for each laser emitting a beam of light having a wavelength $\lambda$, the wavelength-selective mirror reflects only light having $\lambda \pm 4$ nm, preferably only light having $\lambda \pm 3$ nm, more preferably only light having $\lambda \pm 2$ nm, and even more preferably only light having $\lambda \pm 1$ nm. In some such embodiments, the wavelength-selective mirror is therefore substantially transparent, that is to say, that a wearer can see through the wavelength-selective mirror with little or no color distortion. Such wavelength-selective mirrors (e.g., reflecting only one, only two, only three, or only four wavelengths) can be made using any suitable technology, for example commercially-available technologies from S1 Optics GmbH, Nürtingen, Germany and CVI Laser, LLC, Albuquerque, New Mexico, USA.

Figure 1A:
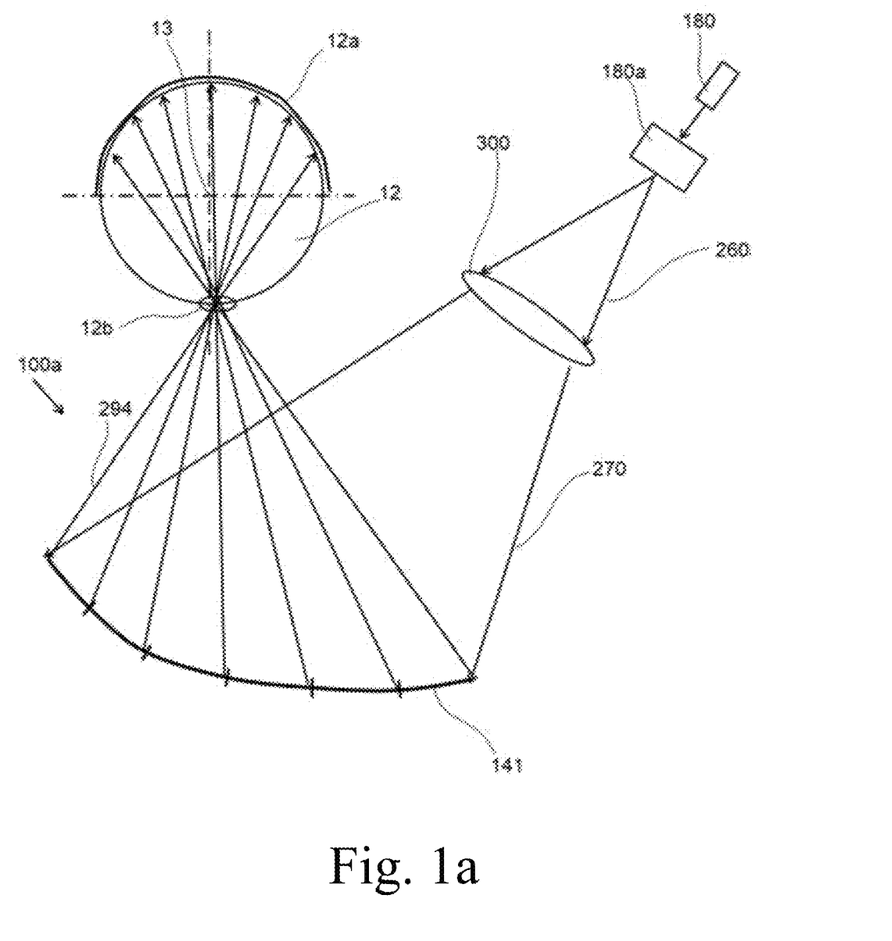
FIG. 1a is a schematic diagram of a first whole-image embodiment of a wearable virtual retinal display device.
Figure 1B:
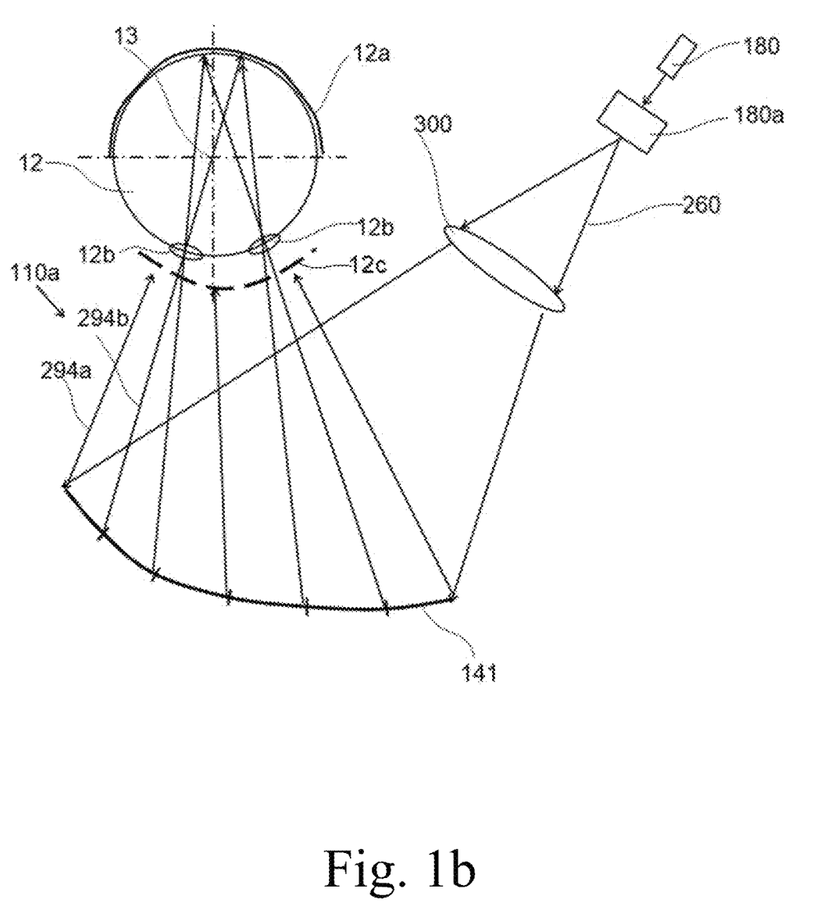
FIG. 1b is a schematic diagram of a first embodiment of a wearable virtual retinal display device providing a partially visible laser pattern.

Reference is now made to FIGS. 1(*a*,*b*) to 4(*a*,*b*) presenting alternative embodiments of an optical arrangement of a VRD device shown in a cross-section in the horizontal plane of eye 12 having a center of rotation 13 of a wearer viewed from above along the vertical axis.

In VRD devices (100*a*, 100*b*, 110*a*, 110*b*, 10*a*, 10*b*, 10*c*, and 10*d*), laser 18 (lasers 18-1 and 18-2) generating a laser beam (laser beams), which is (are) spatially scanned by a mirror driven by microelectromechanical system (MEMS) 18*a* (18*a*-1 and 18*a*-2). The scanned laser beam forms a laser radiation pattern to be projected onto the person's retina 12*a*. The VRD devices comprise two optical channels for projecting the laser radiation pattern onto the person's retina.

Reference is now made to FIGS. 1*a* and 1*b* presenting the first embodiment of the present invention. A beam generated by laser 180, scanned by means of MEMS mirror 180*a*. Scanned beam 260 is directed onto lens 300, which then directs beam 270 onto semitransparent reflector 141. According to optical arrangement 100*a* shown in FIG. 1*a*, reflected beam 294 carrying the whole laser pattern to be projected converges to eye pupil 12*b* in order to pass through it and form an image on retina 12*a*. Alternatively, arrangement 110*a* shown in FIG. 1*b* is configured for creating extended field-of-view 12*c* such that the laser radiation pattern is momentarily observable in a partial manner by means of moving eye pupil 12*b* within extended field-of-view 12*c*. Rays 294*a* are screened from retina 12*a* while rays 294*b* are fall into eye pupil and form a part of an image of interest on retina 12*a*.

Figure 2A:
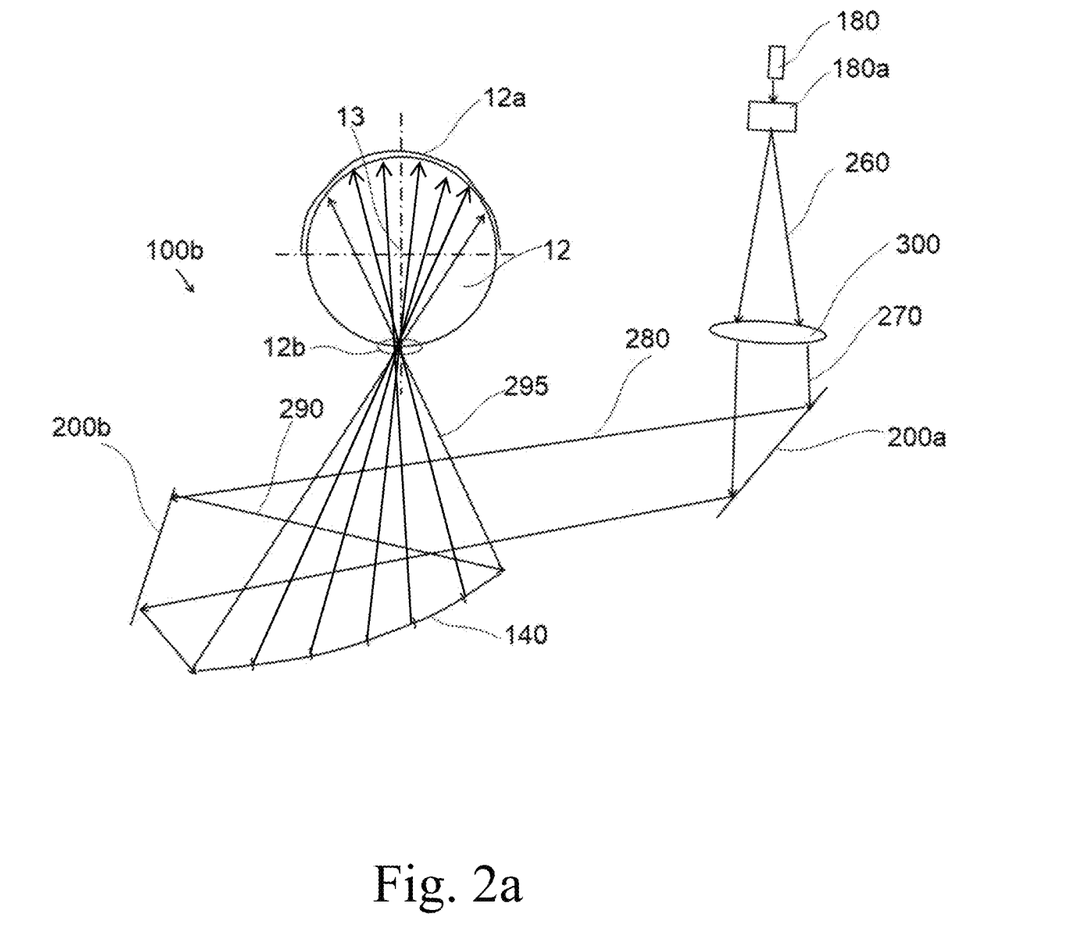
FIG. 2a is a schematic diagram of a second whole-image embodiment of a wearable virtual retinal display device.
Figure 2B:
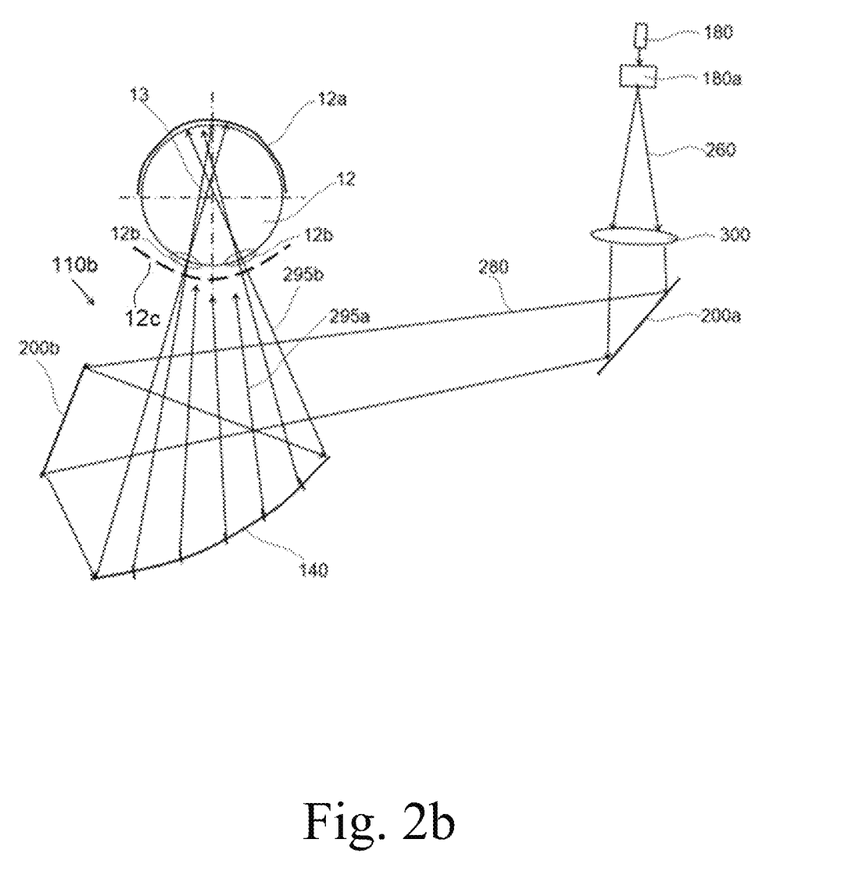
FIG. 2b is a schematic diagram of a second embodiment of a wearable virtual retinal display device providing a partially visible laser pattern.

Reference is now made to FIGS. 2*a* and 2*b* presenting a second embodiment of the present invention. A beam generated by laser 18, scanned by means of MEMS mirror 18*a*. Scanned beam 260 is directed onto lens 300 and then via two folding mirrors 200*a* and 200*b* onto semitransparent reflector 140. Numerals 280 and 290 refer to corresponding beams between elements 200*a*, 200*b* and 140, respectively. Similar to the first embodiment of the present invention, in optical arrangement 100*b* shown in FIG. 2*a*, reflected beam 295 carrying the whole laser pattern to be projected converges to eye pupil 12*b* in order to pass through it and forms an image on retina 12*a*. Alternatively, arrangement 110*b* shown in FIG. 2*b* is configured for creating extended field-of-view 12*c* such that the laser radiation pattern is momentarily observable in a partial manner by means of moving eye pupil 12*b* within extended field-of-view 12*c*. Rays 295*a* are screened from retina 12*a* while rays 295*b* fall into eye pupil 12*b* and form a part of an image of interest on retina 12*a*.

Figure 3A:
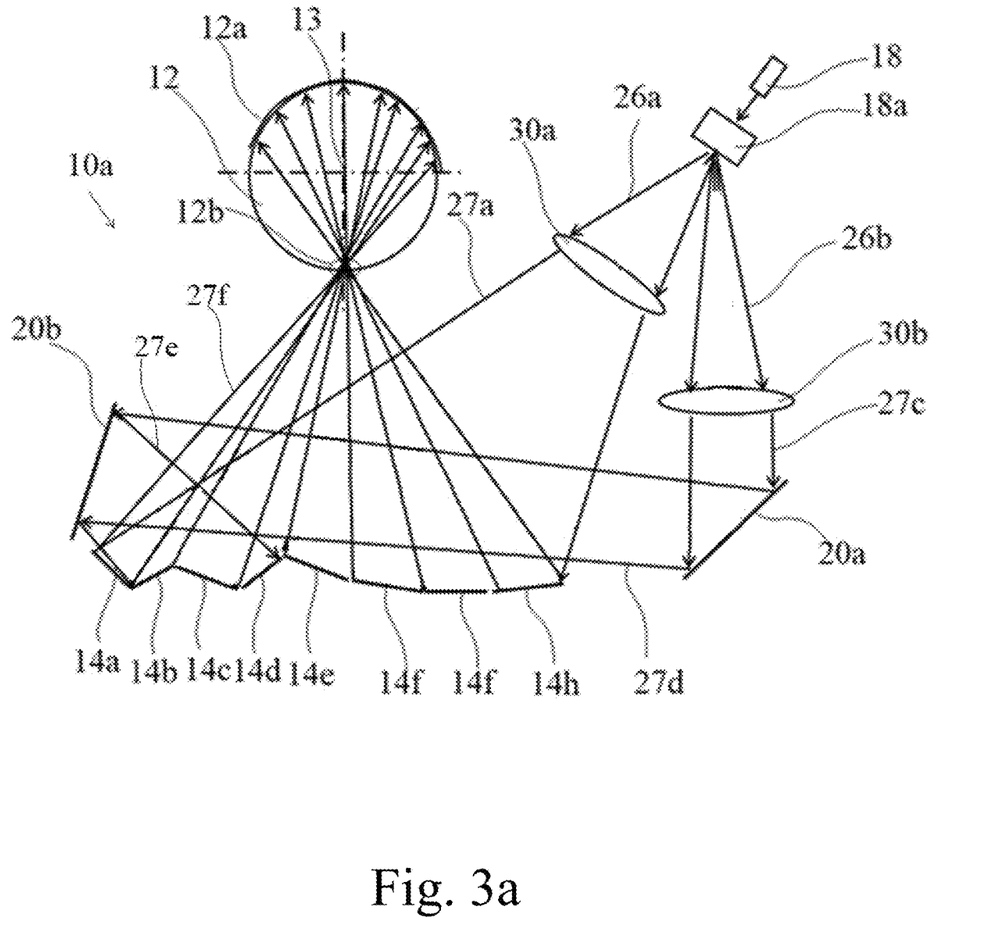
FIG. 3a is a schematic diagram of a third whole-image embodiment of a wearable virtual retinal display device.
Figure 3B:
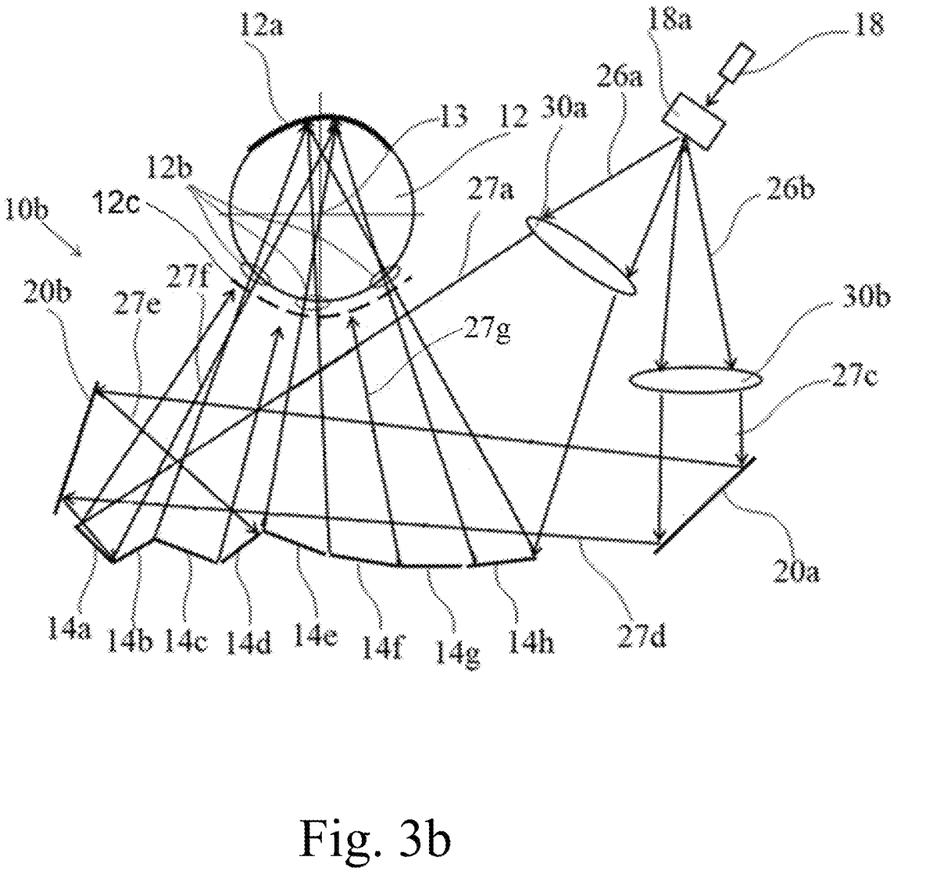
FIG. 3b is a schematic diagram of a third embodiment of a wearable virtual retinal display device providing a partially visible laser pattern.

Reference is made to FIGS. 3*a* and 3*b* presenting a third embodiment of the present invention. The generated laser beam is scanned by MEMS-driven mirror 18*a*. Then, the laser radiation pattern is divided between two optical channels. The scanned laser radiation pattern is divided into two beams 26*a* and 26*b* in first and second optical channels, respectively. In the first channel, lens 30*a* in cooperation with selective reflective elements 14*a*, 14*c*, 14*e*, 14*f*, 14*g* and 14*h* project the scanned laser radiation pattern onto the person's retina such that an image of an object of interest is formed on the abovementioned retina. Specifically, beam 27*a* focused by lens 30*a* is directed to selective reflective elements 14*a*, 14*c*, 14*e*, 14*f*, 14*g* and 14*h*. Further, the reflected beam 27*f* is directed to the person's retina. In the second optical channel, beam 27*c* is directed to folding mirror 20*a*. Reflected beam 27*d* is incident at another folding mirror 20*b*. After the second reflection, beam 27*e* is directed to selective reflective elements 14*b* and 14*d*. The second optical channel is also designed such that lens 30*b*, folding mirrors 20*a* and 20*b*, and selective reflective elements 14*b* and 14*d* form an image of an object of interest on the abovementioned retina either.

We consider selective reflective elements 14*a*, 14*c*, 14*e*, 14*f*, 14*g*, and 14*h* as the first selective reflector belonging to the first optical channel while selective reflective elements 14*b* and 14*d*, as the second selective reflector belonging to the second optical channel. It should be emphasized that the first and second selective reflectors are innovatively arranged in integrated optical element 14 having a piecewise-smooth reflective surface comprising a plurality of curvilinear selective reflecting elements belonging to the first and second selective reflectors and at least partially arranged in turn to each other.

In optical arrangement 10*a* shown in FIG. 3*a*, reflected beam 27*f* carrying the whole laser pattern to be projected converges to eye pupil 12*b* in order to pass through it and forms an image on retina 12*a*. Alternatively, arrangement 10*b* shown in FIG. 3*b* is configured for creating extended field-of-view 12*c* such that the laser radiation pattern is momentarily observable in a partial manner by means of moving eye pupil 12*b* within extended field-of-view 12*c*. Rays 27*g* are screened from retina 12*a* while rays 27*f* fall into eye pupil 12*b* and form a part of an image of interest on retina 12*a*.

Figure 4A:
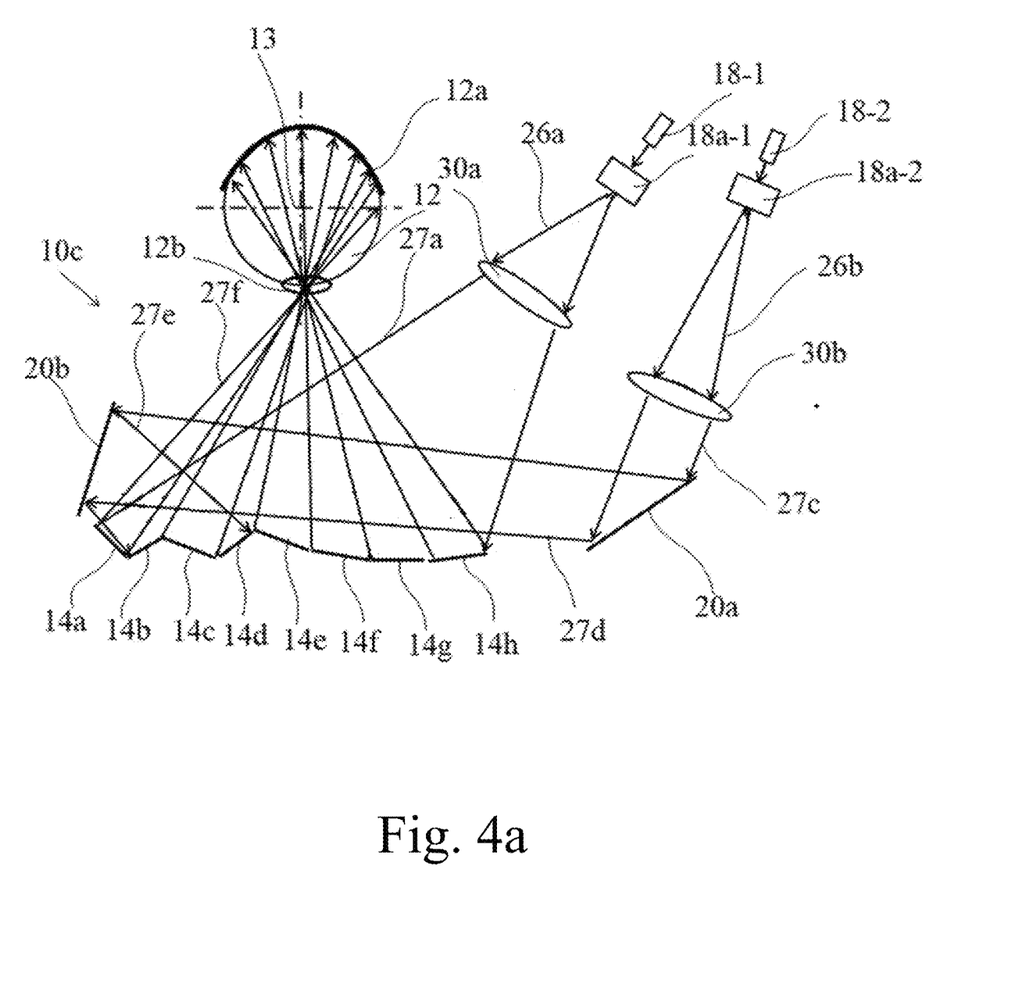
FIG. 4a is a schematic diagram of a fourth whole-image embodiment of a wearable virtual retinal display device.
Figure 4B:
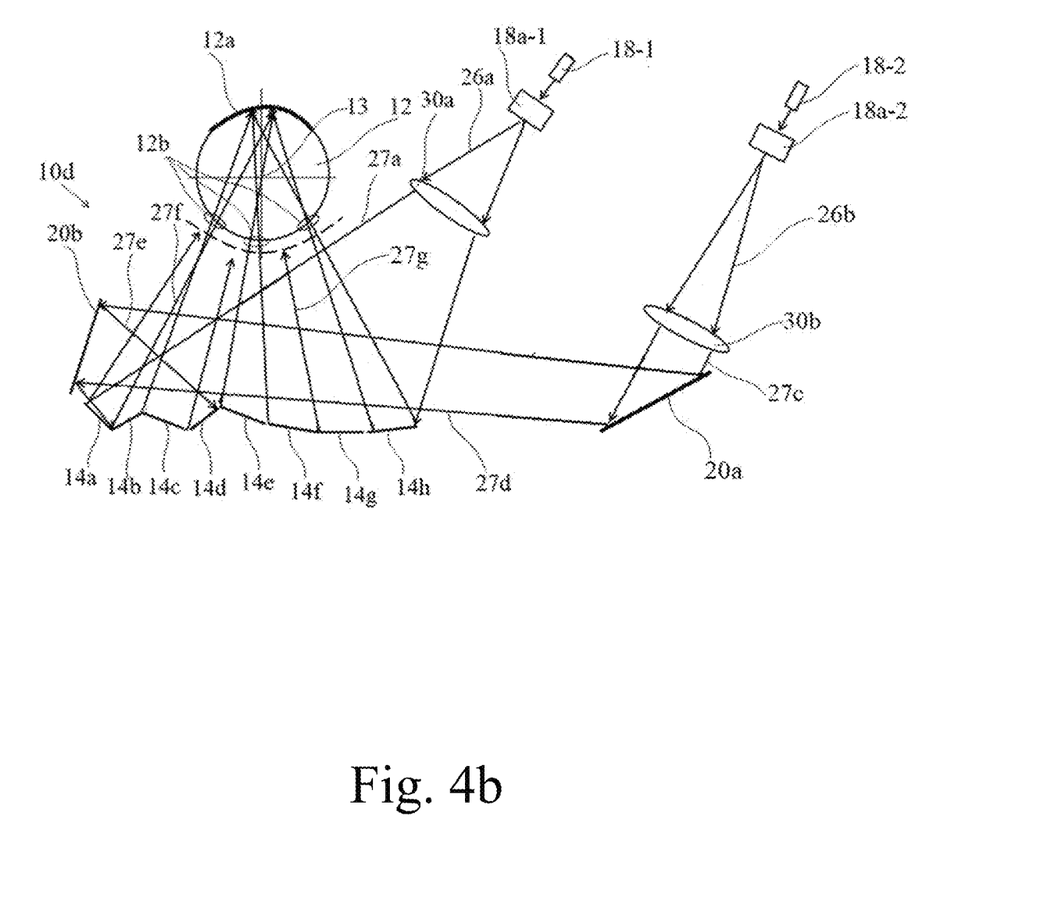
FIG. 4b is a schematic diagram of a fourth embodiment of a wearable virtual retinal display device providing a partially visible laser pattern.

Reference si now made to FIGS. 4*a* and 4*b* presenting a fourth embodiment of the present invention. Each of VRD device 10*c* and 10*d* includes two lasers 18-1 and 18-2 and two MEMSs 18*a*-1 and 18*a*-2. The laser radiation pattern formed by laser 18-1 and MEMS 18*a*-1 is incident on selective reflective elements 14*a* to 14*h*. The laser radiation pattern formed by laser 18-1 and MEMS 18*a*-1 propagates via lens 30*a* to selective reflective elements 14*a*, 14*c*. 14*e*, 14*f*, 14*g* and 14*h* 14*a*, 14*c*. 14*e*, 14*f*, 14*g* and 14*h*. The laser radiation pattern formed by laser 18-2 and MEMS 18*a*-2 propagates via folding mirrors 20*a* and 20*b* and then is incident on selective reflective elements 14*a* and 14*c*. Therefore, the laser radiation patterns in the first and second optical channels are formed by MEMSs 18a-1 and 18a-2, independently.

In optical arrangement 10c shown in FIG. 4a, reflected beam 27f carrying the whole laser pattern to be projected converges to eye pupil 12b in order to pass through it and form an image on retina 12a. Alternatively, arrangement 10d shown in FIG. 4b is configured for creating extended field-of-view 12c such that the laser radiation pattern is momentarily observable in a partial manner by means of moving eye pupil 12b within extended field-of-view 12c. Rays 27g are screened from retina 12a while rays 27f fall into eye pupil 12b and form a part of an image of interest on retina 12a.

In preferred embodiments such as depicted in FIGS. 3(a, b) and FIGS. 4(a, b), MEMS mirror 18a is temporal (near the temple) and the intermediate mirror 20b is nasal (near the nose) relative to integral selective reflector 14. In some non-depicted alternative embodiments, the MEMS mirror is nasal and the intermediate mirror is temporal relative to the set of lenses. According to the present invention, MEMS mirror 18a/18a-1/18a-2 is located in the horizontal plane of eye 12 of the wearer.

Selective reflective elements 14a to 14h of integral selective reflector 14 are covered with multilayer wavelength-selective reflective coating embedded in supporting lens 22 made of optical-grade polycarbonate.

Selective reflective elements 14a to 14h constitute substantially vertically-oriented strips hat in the horizontal planes are linear and arranged side-to-side with neighboring selective reflective elements forming integral selective reflectors 14. The angle of each selective reflective element in the horizontal plane relative to the frontal plane is such that the selective reflective elements alternatingly face the MEMS mirror 18a and folding mirror 20b, from above giving the set 14 of selective reflective elements 14a to 14d the appearance of concertina-folded paper. Specifically, selective reflective elements 14a, 14c. 14e, 14f, 14g and 14h face MEMS mirror 18a and selective reflective elements 14b and 14d face folding mirror 20b. The angle of each selective reflective elements 14a to 14h relative to the frontal plane is constant. For selective reflective elements 14a, 14c. 14e, 14f, 14g, and 14h facing MEMS mirror 18a, the angle relative to the frontal plane is increasingly acute the further the curved mirror is from the MEMS mirror 18a.

According to one embodiment of the present invention, VRD device 10a (FIG. 1a) comprises a gaze tracking unit (not shown). MEMS 18a is configured for forming a momentary laser radiation pattern within a field of view corresponding to a momentary gaze of eye 12. The laser radiation pattern formed by the first and second channels is projected via eye lens 12b onto retina 12a such that the laser radiation pattern is projected onto the eye retina at any position of the person's eye. Therefore, the laser radiation pattern is viewable at any position of the person's eye.

Figure 5:
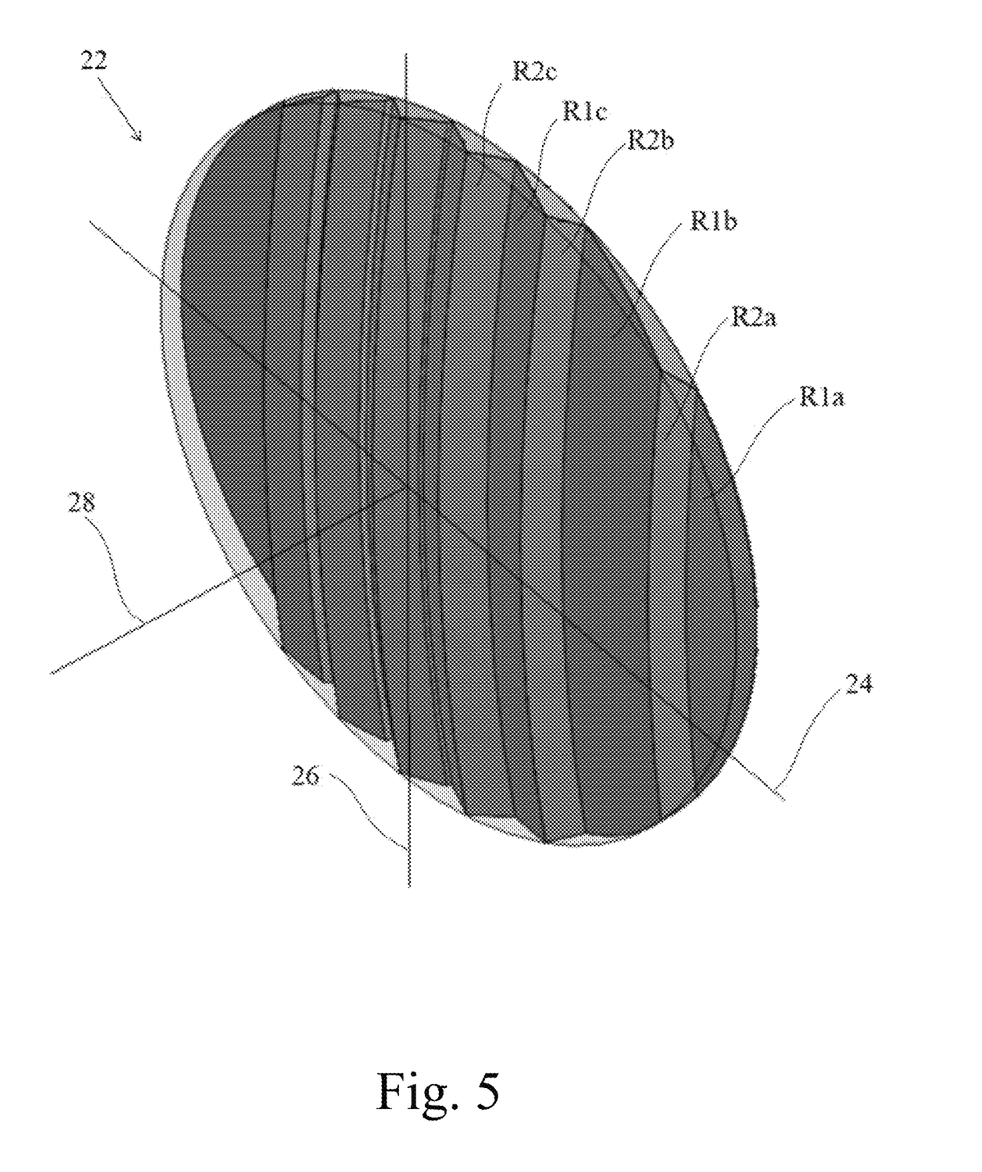
FIG. 5 is a perspective view of an integrated selective reflector.

Reference is now made to FIG. 5, presenting a perspective view of exemplary supporting lens 22 of device 10 Supporting lens 22 is characterized by horizontal axis 24, vertical axis 26, and anteroposterior axis 28 which also coincides with direction 12 of eye gaze when the person gazes ahead. Sagittal planes separate left from right portions and are perpendicular to horizontal axis 24. Transverse planes separate upper from lower portions and are perpendicular to vertical axis 26. Coronal (i.e., vertical) planes separate front from back portions and are perpendicular to anteroposterior axis 28. All selective reflective elements are curved within the coronal plane. Folding mirror 20b is analogously curved in the sagittal plane. For the reason of simplicity, selective reflective elements R1a, R1b, and R1c belong to the first optical channel, while selective reflective elements R2a, R2b, and R2c to the second optical channel.

The exact relative physical position of MEMS mirror 18a, folding mirror 20, and selective reflective elements as well as the dimensions, angles, and curvatures thereof are selected so that for a wide range of gaze directions of the eye of the wearer, MEMS mirror 18a can be oriented so as to reflect light emitted by the laser either:

towards a selected one of the curved mirrors of the set of mirrors facing the MEMS mirror 18a to be reflected from selected selective reflective elements 14a, 14c. 14e, 14f, 14g, and 14h through the pupil of the eye to illuminate the retina of the eye; or towards the folding mirror 20b, to be reflected from the folding mirror 20b towards a selected one of the selective reflective elements 14b and 14d through the pupil of the eye to illuminate the retina of the eye.

Further, the device is configured so that the light paths described above pass through an empty volume between the set of mirrors and parts of a wearer's body.

In FIGS. 1b, 2b, 3(a, b) and 4(a, b), folding mirror 20b is linear in the horizontal plane. In some embodiments, folding mirror 20b is concavely curved (e.g., spherically curved or aspherically curved) facing the selective reflective elements.

Further, laser 18 and MEMS mirror 18a and focusing lenses 30a and 30b, are linearly displaceable by micromotors (e.g., linear stepper motors) in longitudinal and transversal directions. FIGS. 3(a, b) and 4(a, b) show a ray diagram of scanning a laser beam by MEMS mirror 18a through convex focusing lenses 30a and 30b towards either:

any of selective reflective elements 14a, 14c. 14e, 14f, 14g, and 14h to be reflected therefrom towards a center of rotation 13 of eye 12 and, if the pupil of eye 12 was correctly oriented, to illuminate a portion of the retina of eye 12; or folding mirror 20b to be reflected therefrom towards any of selective reflective elements 14b and 14d to be reflected therefrom towards a center of rotation 13 of eye 12 and, if the pupil of eye 12 was correctly oriented, to illuminate a portion of the retina of eye 12.

To illuminate a specific desired portion of the retina of eye 12, the controller of MEMS system 18 directs MEMS mirror 18a to reflect the laser beam towards an appropriate one of selective reflective elements 14a-14k. In some instances, it is necessary to move MEMS system 18 along transporting rail 32 forwards or back parallel to the anteroposterior axis 28 and/or along the vertical transporting rail up or down parallel to the vertical axis 26 to an appropriate position on frame 16.

In preferred embodiments, the components of the device are configured such that the beams of light that make up an entire image that is displayed on the retina using the device for VRD all pass through a portion of the vertical plane of the pupil that has a cross-sectional area of not more than 1 mm$^2$. Such a configuration provides a pinhole effect.

Figure 6A:
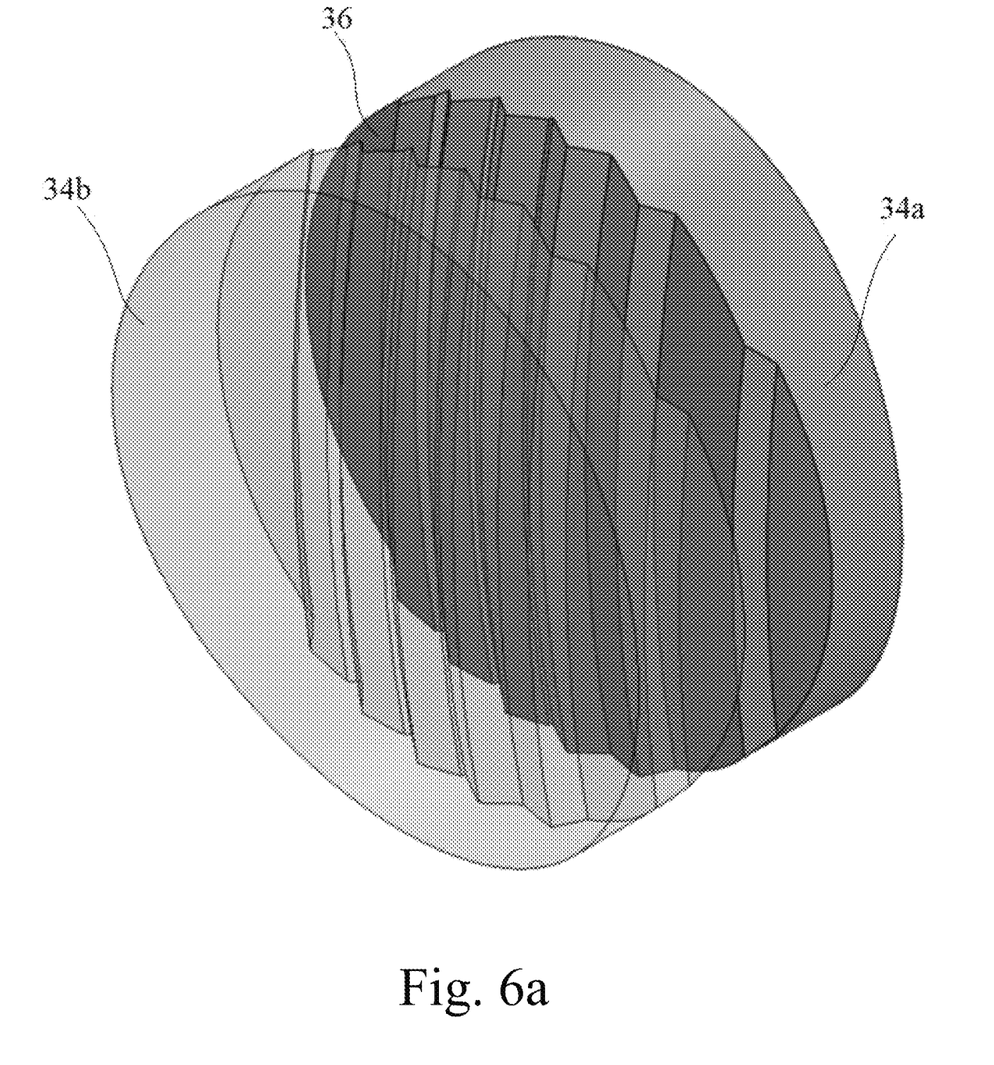
FIGS. 6a and 6b are perspective views of alternative embodiments of an integrated selective reflector.
Figure 6B:
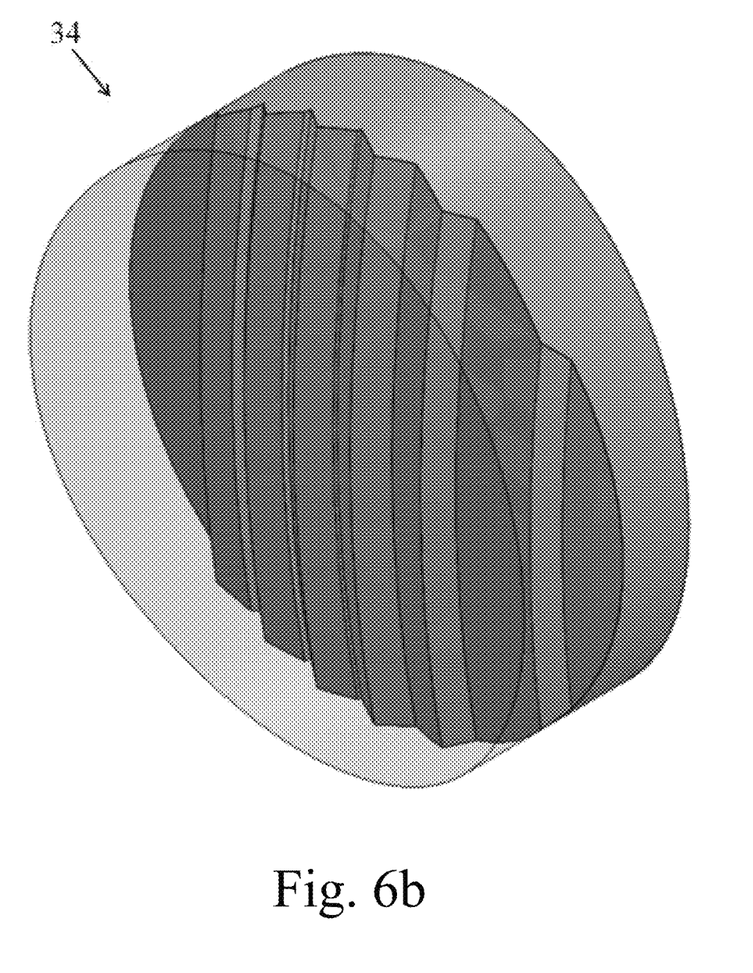

Reference is now made to FIGS. 6a to 6c presenting perspective views of alternative embodiments of an integrated selective reflector. In FIG. 6a, surfaces of two polycarbonate workpieces 34a and 34b are precisely made (e.g., by molding and/or machining) to form the desired shape of selective reflective elements (14a to 14h) of integrated selective reflector 14. Surface 36 of workpiece 34a is provided with an interference coating configured for reflecting laser radiation of at least one wavelength λ. In some embodiments, Reflector 36 is provided with two or more interference coatings configured for reflecting two or more wavelengths of interest. Workpieces 34a and 34b have an air gap therebetween. In FIG. 6b, workpieces 34a and 34b are in optical contact with each other, e.g., by welding to make a single block 34 made of polycarbonate with integrated selective reflector 14 embedded therein. It should be appreciated that covering workpiece 34 is conformal with reflector 36 such that aberration caused by propagating the surrounding radiation though covering workpiece 34 are minimized.

As is understood from the description and accompanying figures, embodiments of the optical device according to the teachings herein allow directing light emitted from a laser to illuminate the retina of an eye when the optical axis of the eye is directed in different directions.

Unless otherwise defined, all technical and scientific terms used herein have the same meaning as commonly understood by one of ordinary skill in the art to which the invention pertains. In case of conflict, the specification, including definitions, takes precedence.

The invention claimed is:

1. A wearable virtual retinal display (VRD) device configured to be worn by a person; said VRD comprising a spectacle-like frame puttable on a head of said person; said spectacle-like frame carrying the following elements disposed along a laser beam:
   a. a laser light source configured for generating said laser beam at at least one radiation frequency;
   b. a microelectromechanical system (MEMS) configured for scanning said laser beam forming a laser radiation pattern to be projected to a person's retina;
   c. a lens;
   d. a selective reflector positionable in front of a person's eye; said selective reflector being configured for reflecting laser radiation at said at least one frequency; wherein said selective reflector has a piecewise-smooth reflective surface comprising a plurality of curvilinear selective reflecting elements, which in cooperation with said lens are configured for directing said laser radiation pattern onto a person's retina; said laser radiation pattern being scanned by said MEMS forms an image of an object of interest on said person's retina.

2. The VRD according to claim 1, wherein said reflector is semitransparent for surrounding light and enables seeing surrounding space by said person.

3. The VRD according to claim 1 comprising at least one folding mirror configured for directing said scanned laser beam onto said reflector.

4. The VRD device according to claim 1 comprising a gaze tracking unit which in coordination with said MEMS is configured for forming a momentary laser radiation pattern within a field of view corresponding to a momentary gaze direction of said eye such that said laser radiation pattern is projectable onto said eye retina through an eye pupil of said person at any position of said eye pupil.

5. The VRD according to claim 4, wherein said selective reflector in cooperation with said lens is configured for forming said laser beam passing through said eye pupil into a spot having an area ranging between 0.75 and 1.25 mm² resulting in a pinhole effect.

6. The VRD device according to claim 1, wherein said MEMS is configured for forming said laser radiation pattern within an extended field of view such that said laser radiation pattern is partially observable by means of moving said eye pupil within said laterally extended field.

7. The VRD device according to claim 1, wherein said laser light source, MEMS, and lens are displaceable for adjusting said laser radiation pattern to be projected onto said person's retina.

8. A wearable virtual retinal display (VRD) device configured to be worn by a person; said VRD comprising a spectacle-like frame puttable on a head of said person; said spectacle-like frame carrying the following elements disposed along a laser beam:
   a. a laser light source configured for generating said laser beam at at least one radiation frequency;
   b. a microelectromechanical system (MEMS) configured for scanning said laser beam forming a laser radiation pattern to be projected to a person's retina;
   c. first and second optical channels for projecting said laser radiation pattern to said person's retina; said first channel comprising a first lens and a first selective reflector positionable in front of a person's eye; said second channel comprising a second lens, at least two folding mirrors and second selective reflector positionable in front of a person's eye adjacent to said first selective reflector;
   said first and second selective reflectors being configured for reflecting laser radiation at said at least one frequency;
   said first and second selective reflectors in cooperation with said first and second lenses being configured for directing said laser radiation pattern onto a person's retina; said laser radiation pattern being scanned by said MEMS forming an image of an object of interest on said person's retina;
   wherein said first and second selective reflectors are arranged in an integrated optical element having a piecewise-smooth reflective surface comprising a plurality of curvilinear selective reflecting elements belonging to said first and second selective reflectors and at least partially arranged in turn to each other.

9. The VRD according to claim 8, wherein said integrated optical element is semitransparent for surrounding light and enables seeing surrounding space by said person.

10. The VRD device according to claim 8, wherein said laser light source, MEMS, first and second lenses are displaceable for adjusting said laser radiation pattern to be projected onto said person's retina.

11. The VRD device according to claim 8, wherein said integrated optical element is a profiled molded element carrying a spectrally selective reflecting coating at said at least one radiation frequency.

12. The VRD device according to claim 8 comprising a gaze tracking unit which in coordination with said MEMS is configured for forming a momentary laser radiation pattern within a field of view corresponding to a momentary gaze of said eye such that said laser radiation pattern is projectable onto said eye retina at any position of said person's eye.

13. The VRD according to claim 12, wherein said first and second selective reflector in cooperation with said first and second lenses, respectively, are each configured for forming said laser beam passing through said eye pupil into a spot having an area ranging between 0.75 and 1.25 mm² resulting in a pinhole effect.

14. The VRD device according to claim 8, wherein said first and second optical channels are configured for forming said laser radiation pattern within an extended field of view such that said laser radiation pattern is partially observable by means of moving said eye pupil within said extended field of view.

15. A VRD device configured to be worn by a person; said VRD comprising a spectacle-like frame puttable on a head of said person; said spectacle-like frame carrying first and second optical channels for projecting a laser radiation pattern to a person's retina; said first channel comprising:
    a. a first laser light source configured for generating said laser beam at at least one radiation frequency;
    b. a first microelectromechanical system (MEMS) configured for scanning said laser beam forming a laser radiation pattern to be projected to a person's retina;
    c. a first lens; and
    d. a first reflector positionable in front of a person's eye;
said second channel comprising:
    a. a second laser light source configured for generating said laser beam at at least one radiation frequency;
    b. a second microelectromechanical system (MEMS) configured for scanning said laser beam forming a laser radiation pattern to be projected to a person's retina;
    c. a second lens; and
    d. at least two folding mirrors; and
    e. second selective reflector positionable in front of a person's eye adjacent to said first selective reflector;
said first and second reflectors being configured for reflecting laser radiation at said at least one frequency generated by said first and second laser light sources;
said first and second selective reflectors in cooperation with said first and second lenses being configured for directing said laser radiation pattern onto a person's retina; said laser radiation pattern being scanned by said MEMS forming an image of an object of interest on said person's retina;
wherein said first and second selective reflectors are arranged in an integrated optical element having a piecewise-smooth reflective surface comprising a plurality of curvilinear selective reflecting elements belonging to said first and second selective reflectors and at least partially arranged in turn to each other.

16. The VRD device according to claim 15, wherein said laser light source, MEMS, first and second lenses are displaceable for adjusting said laser radiation pattern to be projected onto said person's retina.

17. The VRD device according to claim 15, wherein said integrated optical element is a profiled molded element carrying a spectrally selective reflecting coatings at said at least one radiation frequency.

18. The VRD device according to claim 15 comprising a gaze tracking unit which in coordination with said MEMS is configured for is configured for forming a momentary laser radiation pattern within a field of view corresponding to a momentary gaze of said eye such that said laser radiation pattern is projectable onto said eye retina at any position of said person's eye.

19. The VRD according to claim 18, wherein said first and second selective reflectors in cooperation with said first and second lenses, respectively, are each configured for forming said laser beam passing through said eye pupil into a spot having an area ranging between 0.75 and 1.25 $mm^2$ resulting in a pinhole effect.

20. The VRD device according to claim 15, wherein said first and second optical channels are configured for forming said laser radiation pattern within a laterally extended field of view such that said laser radiation pattern is observable by means of laterally moving said person's eye within said laterally extended field of view.

* * * * *